April 29, 1924.
C. B. McLEER
1,492,301
SIGNAL AND CONTROL SYSTEM
Filed March 1, 1922
4 Sheets-Sheet 1
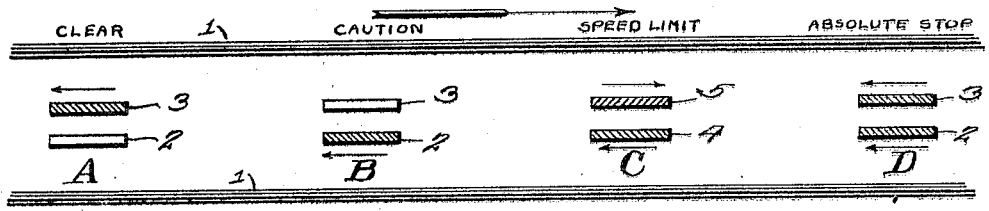
Fig.1
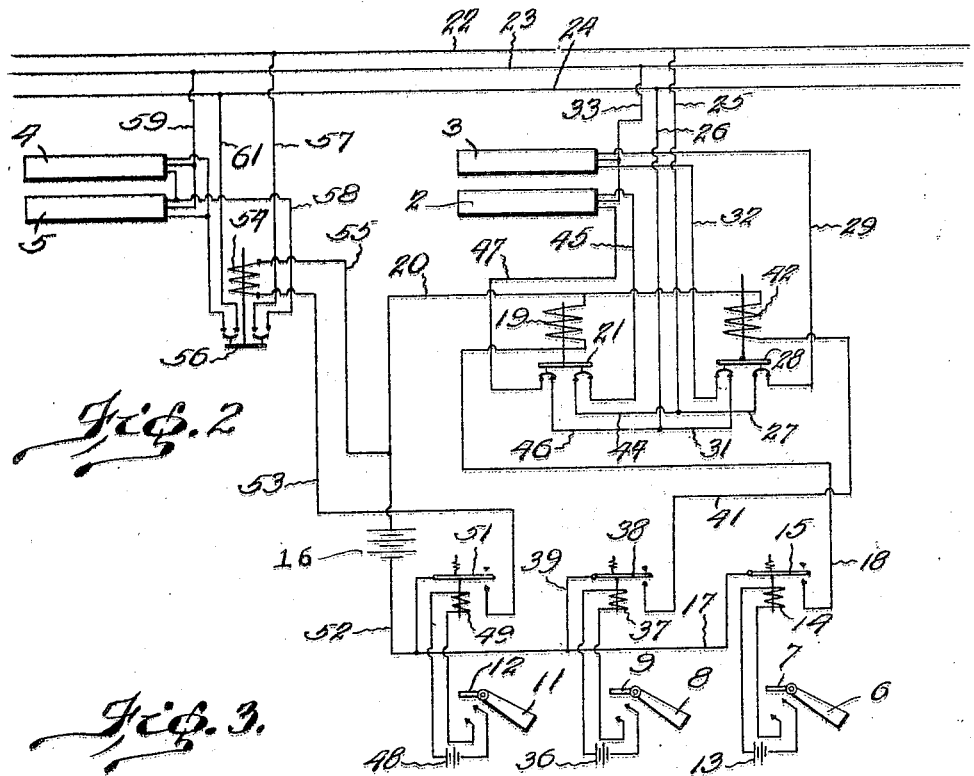
Fig.2
Fig.3
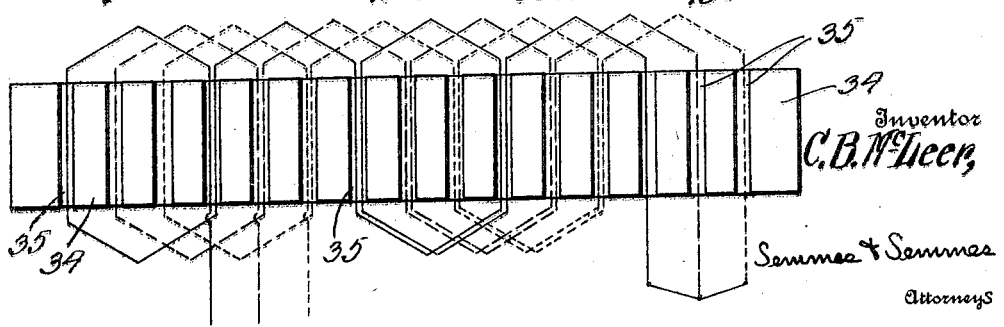
Inventor
C. B. McLeer,
Semmes & Semmes
Attorneys April 29, 1924.

C. B. McLEER 1,492,301

SIGNAL AND CONTROL SYSTEM

Filed March 1, 1922

Inventor
C. B. McLeer,
By Semmes & Semmes
Attorneys

April 29, 1924.

C. B. McLEER

SIGNAL AND CONTROL SYSTEM

Filed March 1, 1922    4 Sheets-Sheet 4

Inventor
C.B. McLeer

By Semmes & Semmes
Attorneys

Patented Apr. 29, 1924.

1,492,301

UNITED STATES PATENT OFFICE.

CHARLES B. McLEER, OF PASSAIC, NEW JERSEY.

SIGNAL AND CONTROL SYSTEM.

Application filed March 1, 1922. Serial No. 540,149.

*To all whom it may concern:*

Be it known that I, CHARLES B. McLEER, a citizen of the United States, residing at Passaic, in the county of Passaic and State of New Jersey, have invented certain new and useful Improvements in Signal and Control Systems, of which the following is a specification.

My invention relates to train signal and control systems, and more particularly those using electric currents, wherein the signal and control are automatic.

An object of my invention is to provide a system for signalling and control which is operated by the movements of visible semaphores placed along the track.

Another object of my invention is to provide a system of speed control, whereby the speed of a train may be limited by the speed of a magnetic field travelling near the right-of-way.

A further object of my invention is to provide a signal and control system employing travelling magnetic fields near the path of travel of the train in which the field flux when travelling in a direction opposite to that of the travel of the train causes amplified induced currents in the apparatus carried by the locomotive.

Another object of my invention is to provide a system which, when any of the relays controlled by the semaphores fail to operate, will cause the train to stop.

A further object of my invention is to provide a system which upon failure of current at the source will bring the train to a standstill.

A still further object of my invention is to provide a system with means for controlling the speed of the train in combination with an absolute stop operating at another point on the track.

Practically all railroads are now equipped with signals operated automatically in such a manner that the engineer can tell when to run cautiously or to stop. The signals are given by lights and semaphores placed on posts alongside of or on bridges spanning the tracks. On weakness of these arrangements is that the engineer must see and interpret the meaning of the signal at a considerable distance in rainy or foggy weather, and when running at high speeds. It is optional with the engineer whether or not he obeys the signals warning him of danger ahead.

Heretofore, it has not been possible to properly control the speed of trains. Numerous devices have been tried but they have proved impracticable for the reason that they were not positive in operation, and were quickly put out of commission by the shocks or jars to which they were subjected.

An efficient speed controlling device is not only of importance in conjunction with a signal system but it may also be employed before dangerous curves in order to prevent them from being taken at an excessive speed.

My system comprises a clear signal, a warning signal, a speed limit control, and an absolute stop control, which are operated by the motion of semaphores indicating the various conditions of the track. The signals and the stopping of the trains are effected by magnetic induction. Inductive systems have been tried before but my system, by reason of employing polyphase alternating currents producing travelling magnetic fields, has overcome the faults and failures of other systems.

I use track inductance devices having magnetic fields travelling therein in a direction opposite to the motion of the train which cooperate inductively with train inductance devices, whereby the speed with which the lines of force are cut is increased by the motion of the train and the power derived by the inductive relation amplified. In the case of the speed limit stop one of the magnetic fields travels in the direction of the train and it is only when the speed with which the field is moving is exceeded by the train that the apparatus on the locomotive is operated to stop the train.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings, means for carrying the same into practical effect, without limiting the improvements in their useful applications to the particular constructions, which for the purpose of explanation, have been made the subject of illustration.

In the drawings:

Figure 1 is a diagrammatic illustration showing the position of the track inductance devices, the direction of the currents therein, and the direction of travel of the vehicle on the track.

Figure 2 is a schematic illustration of the circuits for controlling the energization of the track inductance devices in which the three-phase current is supplied by mains near the track.

Figure 3 is a diagrammatic illustration of the type of inductance device so wound as to produce a moving field of flux when supplied with three-phase current.

Figure 4:
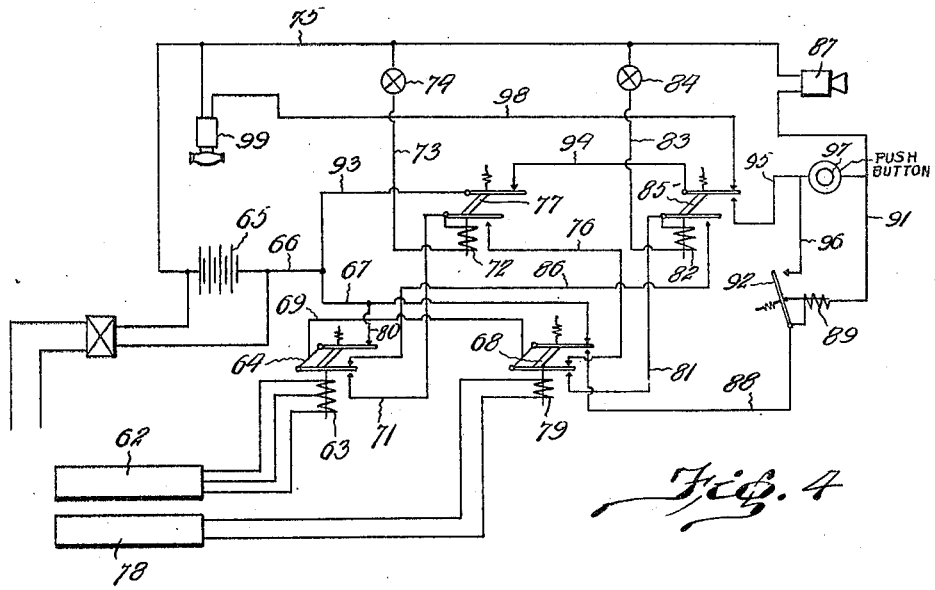
Figure 4 is a schematic illustration of the control system in the cab of the locomotive.

Referring to Figure 1, I have shown tracks 1 in which the motion of travel of the train is indicated by the big arrow. Located between the tracks are a series of sets of track inductance devices A, B, C and D. The set of track inductance devices A comprises a track inductance device 2 and a track inductance device 3. When the clear signal is given, in track inductance device 3 there is a travelling magnetic field travelling in a direction opposed to the direction of the train, but track inductance device 2 is not energized. In this condition a clear signal will be given in the cab of the locomotive, as will hereinafter be described.

In the set of indutcance devices B, when the caution signal is set, the track inductance device 3 is not energized, but the track inductance device 2 has a travelling magnetic field therein travelling in a direction opposed to the direction of motion of the train. The set of track inductance devices B is then properly conditioned to give a warning signal in the cab of the locomotive, as will hereinafter be described.

In the set of track inductance devices C, when the danger signal is set, a track inductance device 5 has a magnetic field travelling therein in the direction of travel of the train, and a track inductance device 4 has a magnetic field travelling therein in a direction opposed to the direction of travel of the vehicle. In the condition of the track inductance devices as illustrated in set C of Figure 1, a warning signal will be repeated in the cab of the locomotive, as will hereinafter be described. If the train is exceeding a certain predetermined speed the train will be stopped, as will hereinafter be described.

In the set of inductance devices D, when the danger signal is set, the track inductance device 3 has a magnetic field travelling therein in a direction opposed to the direction of travel of the vehicle and the inductance device 2 has a magnetic field therein travelling in a direction opposed to the direction of travel of the vehicle. When the set of track inductance devices D is in this condition the train will be brought to an absolute stop regardless of the speed at which it is travelling, as will hereinafter be described.

Referring to Figure 2 I have shown a semaphore arm 6, having a contact plate 7. This semaphore is for indicating a clear condition of the track ahead. A semaphore arm 8 is provided with a contact plate 9. When the semaphore 8 is in horizontal position a caution signal is given. To indicate danger I have shown a semaphore arm 11 having a contact plate 12. For purposes of simplicity I have shown but two track inductance devices 2 and 3, but it is to be understood that there are a plurality of track inductance devices 2 and 3 as indicated in Figure 1.

When the semaphore arm 6 is in horizontal position indicating a clear condition of the track, the contact plate 7 completes a circuit through the battery 13 and solenoid 14. The energization of the solenoid 14 pulls the switch 15, which is normally held in the up position, down to complete a circuit through a battery 16, conductor 17, switch 15, conductor 18, solenoid 19, and conductor 20, back to the battery 16. The solenoid 19 raises a switch 21 which is normally in the down position.

A three-phase main comprising conductors 22, 23, and 24 is tapped by a conductor 25 connected to the main 22 and a conductor 26 tapped to conductor 24. Current from main 22 flows through conductors 25 and 27, through switch 28, which is normally in down position and through conductor 29 to the inductance device 3. Current travels from the line 24 of the three-phase main through conductor 26, conductor 31, switch 28 and conductor 32 into the inductance device 3. Current from the conductor 23 flows through conductor 33 into the inductance device 3.

Referring to Figure 3 there is diagrammatically shown a common type of inductance device which I employ for all my track inductance devices, such as inductance device 3. This inductance device comprises a laminated iron core 34 having slots 35 through which are wound leads from a three-phase main. The coils overlap each other and produce a magnetic field travelling in either direction, depending upon the direction of current in the three-phase main, along the length of the laminated iron core 34. The construction of such an inductance device is of common knowledge in the art and a detail description will not be necessary. The field travels in the same manner that a field travels around the stator of an induction motor, and the inductance devices which I employ are similar to the stator of an induction motor formed in a straight line instead of in circular shape.

A travelling magnetic field is produced in the inductance device 3, travelling in a direction indicated by the small arrow in set A of track inductance devices, Figure 1. No current is flowing through the track inductance device 2 by reason of the fact that the switch 21 is in the up position. Such a condition is indicated in set A (see Fig. 1). In the condition of track inductance devices indicated at A, a visible clear signal will be indicated in the cab of the vehicle, as will be later explained.

When the caution signal is given the semaphore 8 is raised into a horizontal position and the semaphore 6 is in the down position. When the semaphore 6 is in the down position, current no longer flows in the circuit comprising the battery 13 and solenoid 14. The switch 15 is in the up position and the circuit is broken through the battery 16 and solenoid 19 allowing the switch 21 to fall. When the semaphore 8 is in the up position the contact plate 9 completes a circuit through a battery 36 and a solenoid 37, pulling a switch 38 into the down position and closing a circuit through the battery 16, a conductor 39, switch 38, a conductor 41, a solenoid 42, and the conductor 20 back to the battery. The solenoid 42 raises the switch 28 normally in the down position, into the up position.

The circuits are then completed as follows:
From conductor 22 of the three-phase main, through conductor 25, a conductor 44, switch 21 and a conductor 45 to the inductance device 2; from conductor 23 of the three-phase main through conductor 33 to inductance device 2; from conductor 24 of the three-phase main through the conductor 26, a conductor 46, through the switch 21, and a conductor 47 to the inductance device 2.

No travelling field is now being generated in the inductance device 3, since the switch 28 is in the up position. There is a travelling magnetic field travelling in the track inductance device 2 in a direction corresponding to the direction of the small arrow as shown in set B of track inductance devices, Figure 1. Set B of track inductance devices is properly energized to give a caution signal in the cab of the locomotive.

The semaphore 11 indicates danger ahead and operates to limit the speed of the train in passing a certain point and to absolutely stop the train at another point. In the up position of the semaphore 11, the semaphore 6 indicating clear condition of track, and semaphore 8 indicating caution signal, are down, thereby deenergizing the solenoids 14 and 37, respectively, in which cases the switches 15 and 38 are in their up position and the switches 21 and 28 are in the down position. The track inductance devices 2 and 3 are energized and have magnetic fields travelling through them in a direction opposed to the direction of travel of the vehicle. Such a condition is indicated in set D (see Fig. 1). In the condition of track inductance devices indicated at D the train will be brought to a standstill as will be later explained, should the engineer neglect to stop the train before reaching that point of the track.

The speed limiting control is set in operation by the upward movement of semaphore 11 the contact plate 12 on the semaphore closing a circuit through a battery 48 and a solenoid 49. Solenoid 49 draws a switch 51 into the down position whereby a circuit is closed through battery 16, conductor 52, switch 51, conductor 53, solenoid 54 and back to the battery through conductor 55. The solenoid 54 draws a switch 56, normally in the down position, into the up position.

Upon upward movement of the switch 56 a circuit is established from conductor 22 of the three-phase main through a conductor 57, switch 56, a conductor 58 to track inductance devices 4 and 5, likewise a circuit is established from conductor 23 of the three-phase main through a conductor 59 to track inductance devices 4 and 5. A circuit is established from conductor 24 of the three-phase line through a conductor 61 and the switch 56 to the track inductance devices 4 and 5. Inductance 4 is connected so as to produce a magnetic field therein travelling in a direction opposed to the direction of travel of the train, whereas the inductance 5 is connected to produce a magnetic field travelling in the same direction as the direction of travel of the train. (See set of inductance devices C, in Figure 1).

The moving magnetic field in inductance device 5 may be regulated by its construction, and the type of current employed, to travel at a certain predetermined speed. The speed may be 25 miles an hour or any other speed to which it is desired to limit the speed of the train.

Referring to Figure 4, mounted under the cab of the locomotive and adapted to pass over and in inductive relation to the inductance devices 3 and 5 of the series of inductance devices is a train inductance device 62, of a type to generate a three-phase current and which acts as the secondary of a transformer.

Assuming that the semaphore arms 8 and 11 are down and the semaphore arm 6 is in the up position giving the clear signal and that the train is passing over the set of inductance devices A, there will be a travelling magnetic field in the track inductance device 3 travelling in a direction opposed to the direction of motion of the train. A three-phase current will be induced in the inductance device 62 carried by the locomotive when it passes over set A of the track inductance devices, because the lines of magnetic force travelling along the inductance device 3 are cut by the inductance device 62. Should the train be at a standstill, current will be induced in the secondary inductance device 62, since the magnetic field in 3 is moving, but when the train is also moving the speed of cutting the lines of magnetic force is increased by the additional speed of the train, and a greater electromotive force will be induced. This feature makes my system more positive in operation than any heretofore conceived. The current induced in the train inductance device 62 will energize a three-phase relay 63 in circuit therewith, and pull a switch 64 into the down position, thus closing a circuit from a battery 65 through conductors 66, 67, the upper arm of switch 68, a conductor 69, the lower arm of switch 64, a conductor 71, relay 72, a conductor 73, a visible clear signal 74, and back through conductor 75 to the battery, thus giving a visible clear signal in the cab of the locomotive.

The current induced in the inductance device 62 remains for a long enough time to cause the relay 72 to pull a switch 77 into the down position. The switch 77 is held in the down position by current from the battery 65 through conductors 66, 67, upper arm of switch 68, lower arm of switch 68, through a conductor 76, lower arm of switch 77, solenoid 72, conductor 73, visible clear signal 74, conductor 75 and back to battery 65. Thus, after the switch 64 has gone to the up position, the visible clear signal 74 will still be operative.

The train now moves on and passes the caution signal. The semaphore arm 8 is in the up position thus energizing the track inductance device 2 as previously described, and producing therein a travelling magnetic field travelling in a direction opposed to the motion of travel of the train (see small arrow, set of track inductance devices B, Fig. 1). A train inductance device 78 carried under the cab of the locomotive is adapted to inductively cooperate with the track inductance devices 2 and 4 in the series of track inductance devices. No field of flux is travelling in track inductance device 3 of the set of track inductance devices B. In passing over inductance device 2 of the set of inductance devices B, when the caution signal is up, a strong electromotive force is induced in the train inductance device 78. This induced electromotive force operates on a relay 79 to pull the switch 68 into its down position, opening the circuit through relay 72 and releasing the switch 77, which goes to the up position, at the same time closing a circuit through the battery 65, conductors 66 and 67, a conductor 80, through the upper arm of switch 64, conductor 69, through the lower arm of switch 68, a conductor 81, a relay 82, a conductor 83, through a visible caution signal 84 and conductor 75, back to the battery.

The relay 82 pulls down a switch 85 and establishes a circuit from the battery 65 through conductors 66, 67, 80, upper arm of switch 64, lower arm of switch 64, a conductor 86, lower arm of switch 85, solenoid 82, conductor 83, visible caution signal 84, and conductor 75, back to the battery 65.

The circuit through an audible caution signal 87 is closed upon the downward movement of the switch 68, from battery 65 through conductors 66, 67, 80, upper arm of the switch 64, conductor 69, upper arm of switch 68, a conductor 88, a relay 89, a conductor 91, through the audible caution signal 87 and conductor 75, back to the battery.

The relay 89 pulls over a switch 92 to close a circuit from the battery 65 through conductor 66, a conductor 93, upper arm of switch 77, conductor 94, upper arm of switch 85, a conductor 95, conductor 96, switch 92, relay 89, conductor 91, audible caution signal 87 and conductor 75 to the battery 65. The circuit thus completed from the battery through the audible caution signal 87 is held by reason of the fact that the current in the relay 89 holds the switch 92 shut. Should the engineer wish to stop the audible caution signal he may press a push button contact 97 which short circuits the relay 89 allowing the switch 92 to open and upon release of the pressure of the push button the circuit through the audible caution signal 87 is broken.

The train moves on and the semaphore 6 denoting clear and the semaphore 8 denoting caution are in the down position deenergizing solenoids 19 and 42, allowing switches 21 and 28 to close. The semaphore 11 is in the up position denoting dangerous condition of the track ahead. As previously explained, when the semaphore arm 11 is up, track inductance 5 will have a field therein travelling in the direction of motion of the vehicle and at any desired speed. The track inductance device 4 has a field therein travelling in a direction opposed to the motion of the vehicle. The speed of travel of the field in the track inductance 5 is that speed to which it is desired to limit the train. For the direction of travel of the fields see set C of the series of track inductances (Figure 1).

If the train in passing the speed limit set of track inductances C is travelling faster than the field flux in track inductance device 5 the train will be automatically brought to a standstill. By reason of the excess of speed of the train over that of the field travelling in the inductance 5, lines of magnetic force will be cut by the train inductance 62 and currents induced therein.

The currents are in proper phase to operate the three-phase relay 63 which pulls the switch 64 into the down position. If the speed of the train does not exceed that of the field travelling in the track inductance 5, the currents induced in the train inductance 62 will not be in proper phase to operate the three-phase relay 63 and pull the switch 64 into the down position. The travelling magnetic field in track inductance 4 will operate to induce current in the train inductance 78 to operate on the relay 79 to pull the switch 68 into the down position. If switch 64 is up and the switch 68 is down, the train will not be stopped. If the switch 64 and the switch 68 are pulled to the down position at the same time the following operations take place:

The relays 72 and 82 are deenergized, permitting the switches 77 and 85, respectively, to go to the up position, thereby closing the battery circuit through battery 65, conductor 66, conductor 93, through upper arm of switch 77, through conductor 94, through upper arm of switch 85, through conductor 98, through the stop valve 99, and through conductor 75, back to the battery. The current established through the stop valve 99, which is of the usual type, operates to stop the train by shutting off the throttle and applying the brakes. If the currents established in the three-phase relay 63 are not in proper phase to operate the relay to pull the switch 64 into the down position at the same time that the switch 68 is in the down position the caution signal will merely be continued in the cab of the locomotive.

Assuming that the speed in passing the speed limit in set C of track inductance elements has not been greater than the speed of the moving magnetic field in the track inductance element 5, the train may pass on to the set of track inductances D.

As previously stated, the semaphore arm 6 denoting clear signal is down and the semaphore 8 denoting caution signal is down. Switches 21 and 28 are in the down position closing the circuits through switches 21 and 28, as previously described, and there will be moving magnetic fields set up on track inductances 2 and 3 travelling in a direction opposed to the direction of travel of the train. The travelling magnetic field in the track inductance element 2 of set D operates to cause the relay 79 to pull the switch 68 into the down position. The direction of movement of the magnetic field in track inductance 3 of set D is in proper direction to induce currents in the train inductance 62 to operate the three-phase relay 63 and pull the switch 64 into the down position. Since switches 64 and 68 are both in the down position circuit will be established through the stop valve 99 to bring the train to a standstill.

Whenever the semaphore arms 6 and 8 fail to give their signals or if any fault occurs in the operation of solenoids 19 and 42, the switches 21 and 28 will remain in the down position. Moving magnetic fields travelling in a direction opposed to the direction of motion of the train will be generated in the set of track inductance devices A, B, and D, whereby the train will be brought to a standstill. This feature gives added protection.

Figure 5:
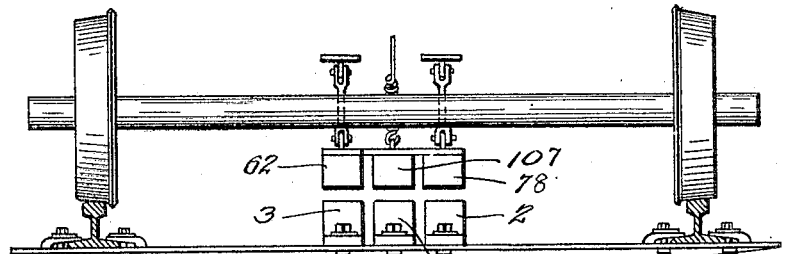
Figure 5 is a detail view in front elevation showing the positions of the cab and locomotive inductance elements in a modification wherein the source of electromotive force is carried by the vehicle.
Figure 6:
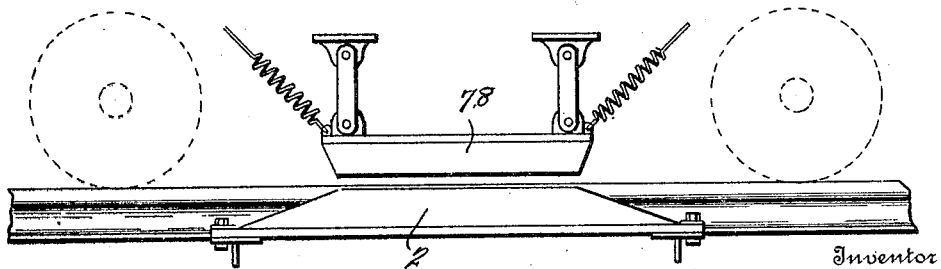
Figure 6 is a view in side elevation of the track and locomotive cab inductance devices in the modification shown in Figure 5, wherein one of the tracks is removed to more clearly show the structure.
Figure 7:
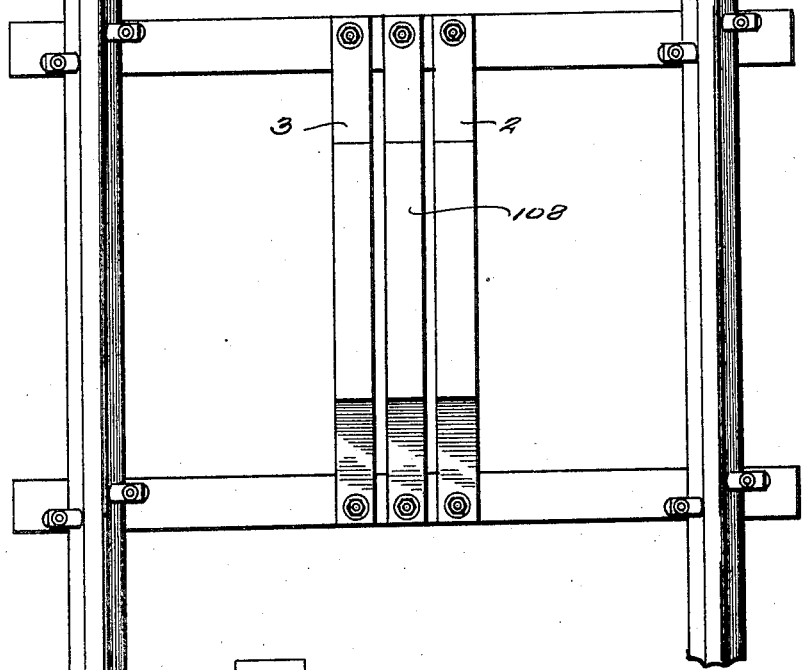
Figure 7 is a top plan view of the track inductance devices of the modification shown in Figure 5.

In Figures 5, 6, and 7, I have shown a modification in which the source of electromotive force whereby the system is operated is carried on the train or locomotive. The principle of operation of this modification will be apparent by reference to the schematic illustration shown in Figure 8.

Figure 8:
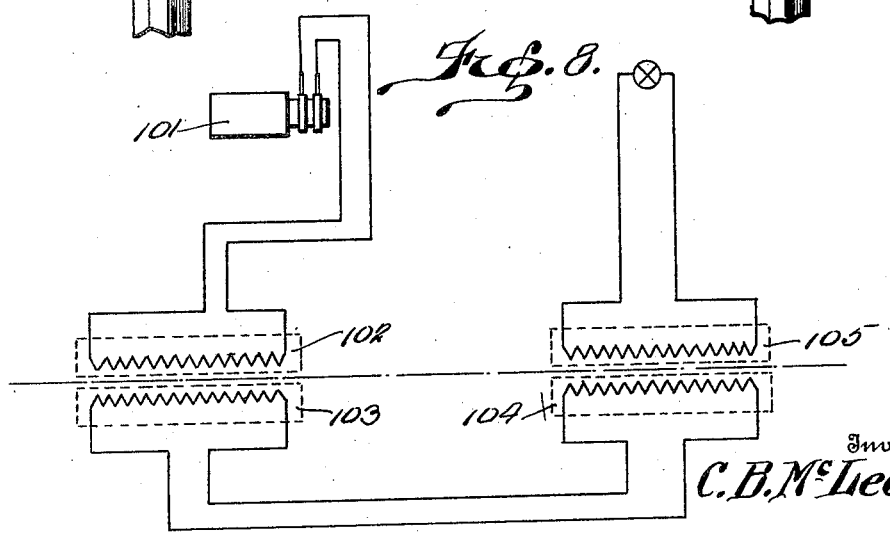
Figure 8 is a diagram illustrating the principle of operation of the modification wherein the source of three-phase current is carried on the locomotive.

In Figure 8 I have illustrated a source of electromotive force 101 producing an alternating current which for the purpose of simplicity in explanation I have not shown as three-phase, though in actual practice three-phase current is employed. An alternating magnetic field is produced in a train inductance device 102 which will induce currents in a track inductance device 103, when the two are in inductive relation, as when the train passes over the track inductance. The currents induced in track inductance 103 produce alternating currents in track inductance 104. The track inductance device 104 operates as the primary of a transformer and induces currents in a train inductance device 105. Thus it will be plain that the source of electromotive force on a train induces current in track inductance devices which in turn will induce currents in train inductance devices to operate my system.

Referring to Figures 5, 6, 7, 9 and 10, I have shown a source of three-phase current 106 supplying three-phase current to a train inductance device 107 carried preferably under the cab of the locomotive. Arranged on the track preferably between the inductance devices 2 and 3 of set A, 2 and 3 of set B, 4 and 5 of set C, and 2 and 3 of set D, I have track inductance devices 108 adapted to be in inductive relation to the train inductance device 107 when the train is passing over any of the sets of inductance devices A, B, C and D. The currents in the train inductance device 107 will induce currents in the track inductance devices 108 when the train passes over them. These track inductance devices 108 supply three-phase current to the track inductance devices 2 and 3 or 4 and 5 of each of the sets of track inductance devices.

The speed of the train in passing, of course, amplifies the inductive effect by increasing the speed with which the lines of force are cut, thus insuring that large currents will pass into the sets of track inductance devices 2 and 3 or 4 and 5. The inductance device 107 may be so connected as to produce a magnetic field travelling in the same direction as the direction of travel of the train, thus further amplifying the inductive effect between the train inductance 107 and the track inductance devices 108.

It will be plainly seen that by carrying on the train my source of electromotive force for producing the signals and controlling the train, I may produce large controlling currents with a small source of current, because of the amplifying effect of the movement of the train. The operation of the semaphore and of the control systems for the track inductances is similar to that previously described in connection with the modification in which a three-phase source of current supplied from a distant station was utilized.

The operation of the control system on the train is similar in practically all respects to the operation of the system previously disclosed.

Figure 9:
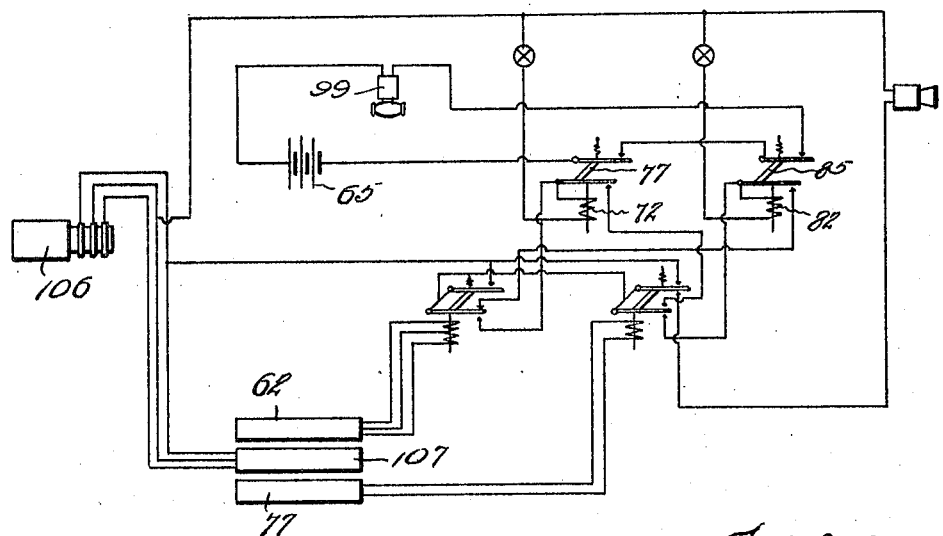
Figure 9 is a diagrammatic view illustrating the circuits in the locomotive cab in the modification wherein the source of three-phase current is carried by the train.
Figure 10:
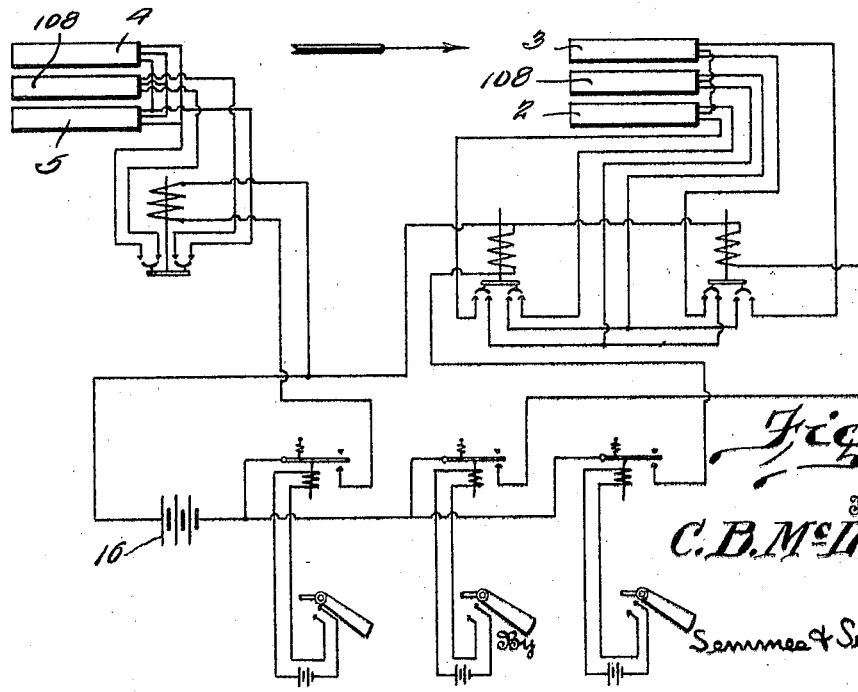
Figure 10 is a diagrammatic view showing the track circuits in the modification wherein the source of three-phase current is carried by the train.

In the scheme illustrated in Figure 9 I have omitted to put in a means for shutting off the audible caution signal but I have done this merely for the purpose of simplicity in the drawings and such a system could, of course, be installed.

In this modification the current supplied for the operation of relays 72 and 82, which control the movement of switches 77 and 85, respectively, is taken from two of the conductors leading from the three-phase source of current 106. Should the source of current 106 fail for any cause the switches 77 and 85 will go to the up position. The battery 65 previously used to operate the relays 72 and 82 is not employed for that purpose in this modification but is merely used to operate the stop valve 99. Therefore, when for any reason, such as failure of current from the source 106, the switches 77 and 85 are in the up position, a circuit will be closed from the battery 65 through the stop valve 99 and the train will be stopped.

I have disclosed a system of train signalling and control which employs travelling magnetic fields thereby increasing the electromotive force used to control the apparatus in the cab of the engine. I have devised a system employing a moving magnetic field to limit the speed of trains. It is obvious that a system similar to the one disclosed could be employed to limit the speed of trains in approaching dangerous curves or other portions of the track where it is not safe for the train to move beyond a certain speed. My system provides for the stopping of the train should the semaphores placed along the track fail to properly operate. In the modification shown, should the source of three-phase current carried by the locomotive fail to deliver current, or should there be a fault in the conductors of such current, or a fault in the train or track control systems, the train will be stopped.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A method of limiting the speed of a self-propelled moving vehicle which comprises the steps of creating a travelling magnetic field near the path of the vehicle, and causing said field to operate on mechanism carried by the vehicle to control the motive power of the vehicle.

2. A method of signalling a moving vehicle which comprises the steps of creating a travelling magnetic field near the path of the vehicle, and causing said field to operate on mechanism carried by the vehicle to give a signal on the vehicle.

3. A method of limiting the speed of a moving vehicle which comprises the steps of creating a magnetic field near the path of the vehicle and travelling at the desired limit speed, and causing said magnetic field to operate on mechanism carried by the vehicle to limit its speed.

4. A method of stopping a moving vehicle which comprises the steps of creating a magnetic field near the path of the vehicle and travelling in a direction opposite to the direction of motion of the vehicle, and causing said magnetic field to operate on mechanism carried by the vehicle to stop the vehicle.

5. A system of control comprising a self-propelled moving vehicle, control means carried by the vehicle, and means for creating a travelling magnetic field near the path of the vehicle, whereby the control means is acted upon to control the motive power of the vehicle in passing.

6. A system of signalling comprising a moving vehicle, signalling means carried by the vehicle, and means creating a travelling magnetic field near the path of the vehicle, whereby the signal means is acted upon to give a signal.

7. A system of control comprising a moving vehicle, control means carried by the vehicle, and means for creating a magnetic field travelling at a desired speed near the path of the vehicle, whereby the control means is acted upon to stop the vehicle when the speed of the vehicle in passing exceeds the speed of the travelling field.

8. A train signalling system comprising a moving vehicle, signalling means carried by the vehicle, a polyphase supply line, and a polyphase inductance device connected to said line and generating a moving magnetic field near the path of the vehicle, whereby the signalling means is acted upon to give signals on the vehicle.

9. A train control system comprising a self-propelled vehicle moving on a track, control means carried by the vehicle, a polyphase supply line, and a polyphase inductance connected to said line and generating a moving magnetic field near the path of the vehicle, whereby the control means is acted upon to control the motive power of the vehicle.

10. A system of control comprising a self-propelled moving vehicle, control means carried by the vehicle, and means for creating a magnetic field travelling in a direction corresponding to the direction of travel of the vehicle, whereby the control means is acted upon to control the motive power of the vehicle in passing.

11. A train stop system comprising a vehicle moving on a track, control means carried by the vehicle, and means for creating a magnetic field travelling in a direction opposite to the direction of travel of the vehicle, whereby the control means is acted upon to stop the vehicle.

12. A system of train control comprising a moving vehicle, a polyphase supply line, polyphase inductance devices connected to said supply line, and generating moving magnetic fields near the path of the vehicle, secondary inductance devices on the vehicle, and a control circuit operated by the current induced in the secondary inductance devices when the speed of the vehicle exceeds a predetermined limit.

13. A system of train control comprising a moving vehicle, a polyphase supply line, polyphase inductance devices connected to said supply line, and generating magnetic fields moving in opposite directions near the path of the vehicle, secondary inductance devices on the vehicle, and a control circuit rendered operative by the currents induced in the secondary inductance devices, to stop the train when the speed exceeds a predetermined limit.

14. A track system having series of pairs of primary inductance devices having moving magnetic fields therein, a pair of secondary inductance devices on a vehicle travelling on the track, signal means on the vehicle controlled by currents induced in said secondary inductance devices, and control means on the vehicle operated by currents induced in the secondary inductance devices.

15. A control system comprising a moving vehicle, a polyphase supply line, polyphase inductance devices connected to said supply line and generating magnetic fields travelling near the path of the vehicle and in the opposite direction to its direction of travel, secondary inductance devices on the vehicle, and a control circuit rendered operative by currents induced in the secondary inductance devices to stop the train.

16. A control system comprising a moving vehicle, a control means carried by the vehicle, and means for creating a magnetic field travelling near the path of the vehicle and in the opposite direction to its travel, whereby the control means is acted upon to stop the vehicle.

17. A signal system comprising a moving vehicle, signal means carried by the vehicle, and means for creating magnetic fields travelling near the path of the vehicle and in the opposite direction to its travel, whereby the signal means is acted upon to give a signal on the vehicle.

18. A method of limiting the speed of a self-propelled moving vehicle which comprises the steps of creating a traveling magnetic field near the path of the vehicle and causing said field to operate on mechanism carried by the vehicle to apply the brakes on the vehicle.

19. A control system for a moving vehicle comprising visible signals along the right-of-way, control circuits rendered operative by said visible signals, primary inductance devices along the right-of-way having travelling magnetic fields therein controlled by said control circuits, secondary inductance devices carried by the vehicle, and circuits rendered operative by said secondary inductance devices to operate signals on the vehicle and control the movement of the vehicle.

20. A method of limiting the speed of a self propelled moving vehicle which comprises the steps of creating a traveling magnetic field near the path of the vehicle and causing said field to operate on mechanism carried by the vehicle to control the motive power of the vehicle and control the brakes.

21. A train control system comprising, a self-propelled vehicle moving on a track, control means carried by the vehicle, a polyphase supply line, and a polyphase inductance connected to said line and generating a moving magnetic field near the path of the vehicle, whereby the control means is acted upon to apply the brakes on the vehicle.

22. A control system comprising a moving vehicle, primary inductance devices along the path of travel of the vehicle, energizing means for said primary inductances, whereby moving magnetic fields travel through said primary inductance devices, controlling means for said energizing means, secondary inductance devices on the vehicle, and control means operated by said secondary inductance devices, whereby when the first mentioned controlling means fails to operate the vehicle will be brought to a standstill.

23. A control system comprising a moving vehicle, primary inductance devices along the path of travel of the vehicle, energizing means for said primary inductance devices, whereby moving magnetic fields travel through said primary inductance devices, controlling means for said energizing means, secondary inductance devices on the vehicle, and control means rendered operative by said secondary inductance devices, whereby when the last mentioned control means fails to operate the vehicle will be brought to a standstill.

24. A track system having a plurality of primary inductance devices having moving magnetic fields therein, secondary inductance devices on a vehicle travelling on the track, signal means on the vehicle controlled by currents in said secondary inductance devices, and control means on the vehicle operated by currents induced in the secondary inductance devices.

25. A train control system comprising, a self propelled vehicle moving on a track, control means carried by the vehicle, a polyphase supply line, and a polyphase inductance connected to said line and generating a moving magnetic field near the path of the vehicle, whereby the control means is acted upon to control the motive power of the vehicle and the brakes.

26. A system of control comprising, a self-propelled moving vehicle, control means carried by the vehicle, and means for creating a magnetic field traveling in a direction corresponding to the direction of travel of the vehicle, whereby the control means is acted upon to apply the brakes on the vehicle in passing should the speed of the vehicle be beyond a certain predetermined point.

27. A system of control comprising, a self-propelled moving vehicle, control means carried by the vehicle, and means for creating a magnetic field traveling in a direction corresponding to the direction of travel of the vehicle, whereby the control means is acted upon to control the motive power supplied to the vehicle and to apply the brakes to the vehicle should the speed of the vehicle be beyond a certain predetermined value.

In testimony whereof I affix my signature.

CHARLES B. McLEER.